United States Patent [19]

Kasuga et al.

[11] 4,415,260

[45] Nov. 15, 1983

[54] DUPLICATING SYSTEM COMPRISING ELECTROPHOTOGRAPHIC COPIER AND OPTION DEVICE

[75] Inventors: Muneo Kasuga; Kiyoshi Miyashita; Masaji Nishikawa, all of Hachioji, Japan

[73] Assignee: Olympus Optical Company Limited, Tokyo, Japan

[21] Appl. No.: 360,444

[22] Filed: Mar. 22, 1982

[30] Foreign Application Priority Data

Mar. 24, 1981 [JP] Japan .................................. 56-41641

[51] Int. Cl.³ ............................................ G03G 15/00
[52] U.S. Cl. .............................. 355/14 SH; 355/3 SH; 355/1; 355/55; 355/8
[58] Field of Search .................... 355/14 SH, 14 R, 11, 355/3 R, 3 SH, 51, 65, 66, 8, 1, 55–57

[56] References Cited

U.S. PATENT DOCUMENTS

| | | | |
|---|---|---|---|
| 3,592,539 | 7/1971 | Haslam et al. | 355/11 |
| 3,623,806 | 11/1971 | Short | 355/64 X |
| 3,747,918 | 7/1973 | Margulis et al. | 271/4 |
| 4,170,412 | 10/1979 | Grace et al. | 355/11 X |

Primary Examiner—R. L. Moses
Attorney, Agent, or Firm—Fleit, Jacobson, Cohn & Price

[57] ABSTRACT

A duplicating system comprises an electrophotographic copier which includes a first document detecting switch, a first optical scanning system for making a slit exposure, a first document feeder for feeding a first document to be copied at a first speed with respect to the first optical scanning system, a rotating photosensitive drum for forming an electrostatic latent image corresponding to the image of document, and apparatus for forming a duplicated copy with the aid of the latent image. An option device is detachably mounted onto the copying apparatus and comprises a second document detecting switch, a second optical scanning system for making a slit exposure, a second document feeder for feeding a second document to be copied at a second speed with respect to the second optical scanning system and an optional optical system for projecting the image of the second document onto the photosensitive drum. The first document feeder in the copier and the second document feeder in the option device are so constructed that one of them is inhibited to operate for a given time period after the other has been operated.

19 Claims, 20 Drawing Figures

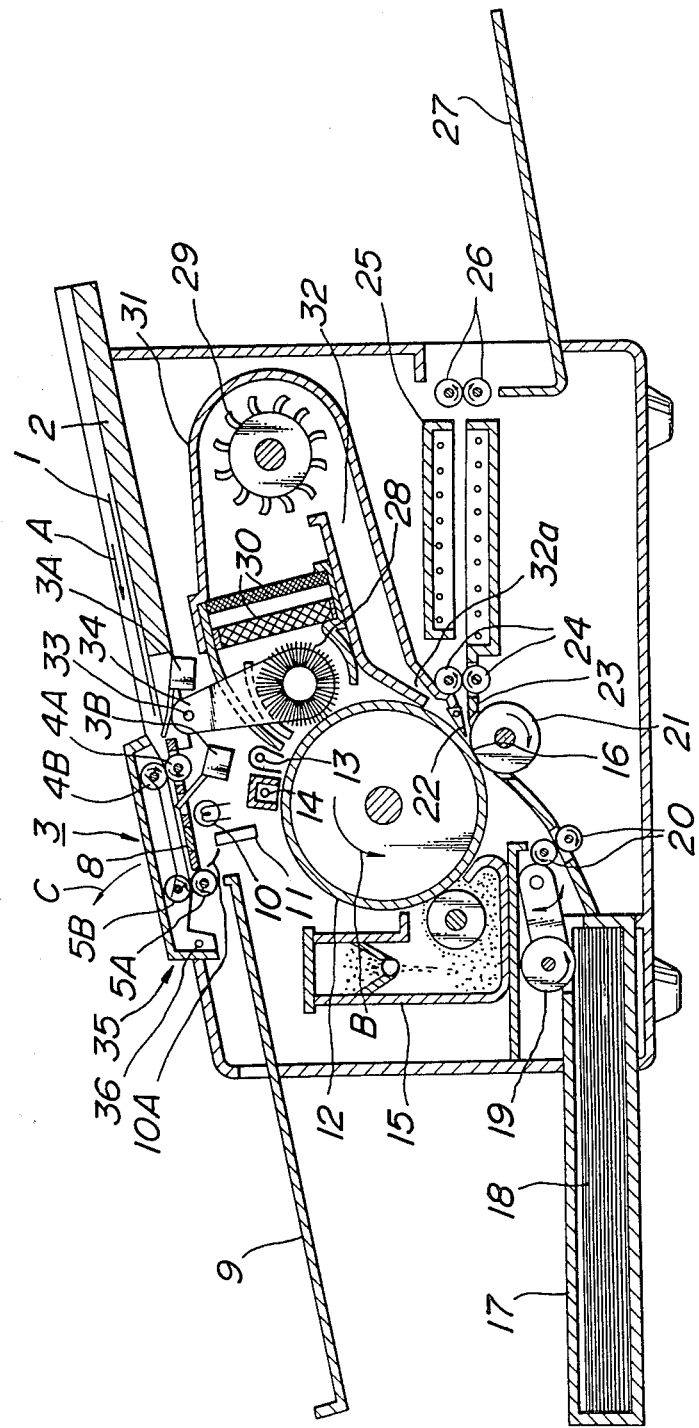

FIG_6
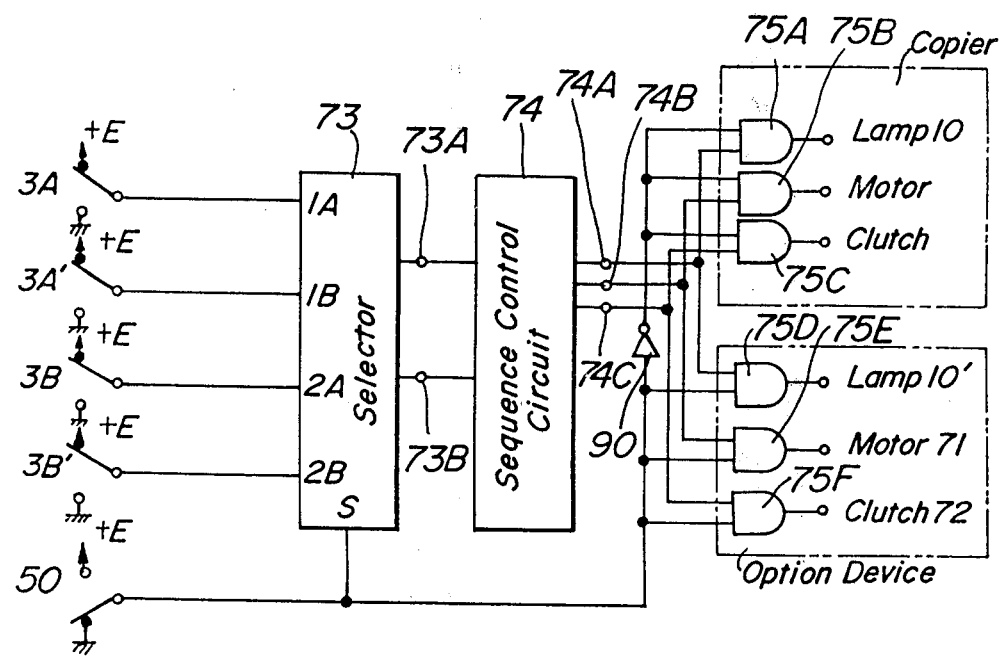

FIG_8b
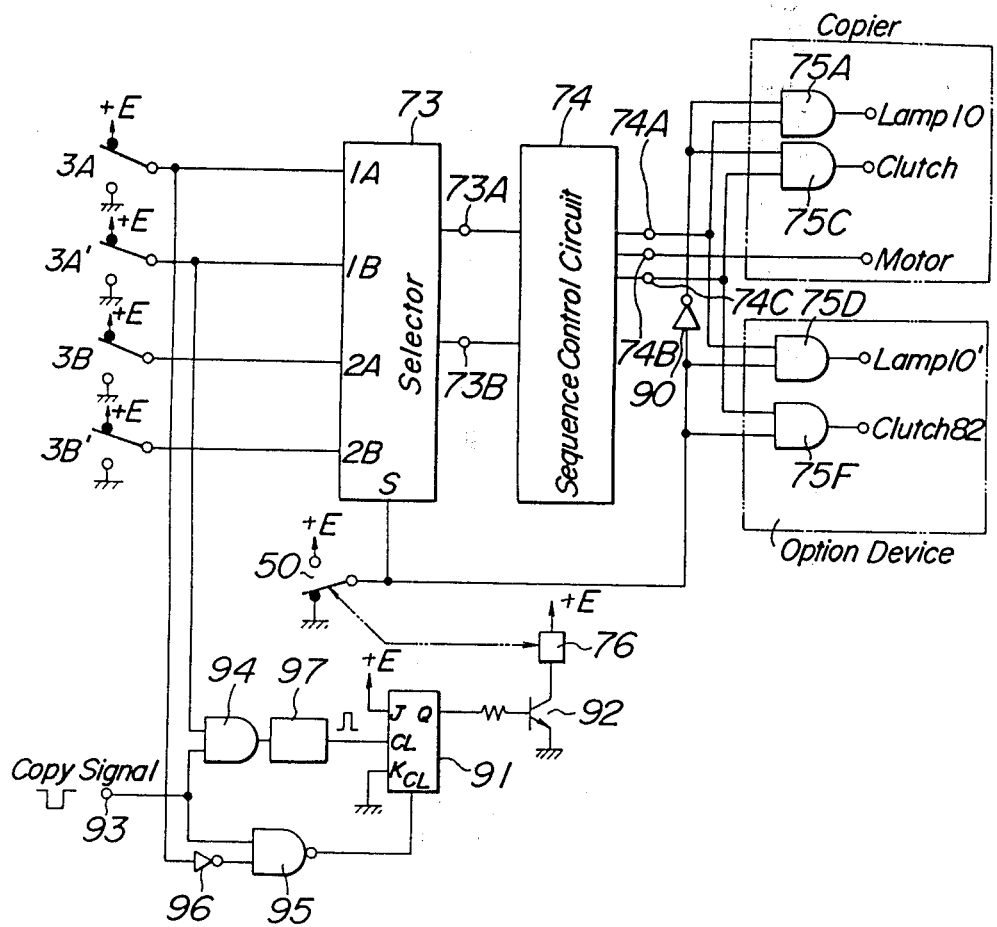

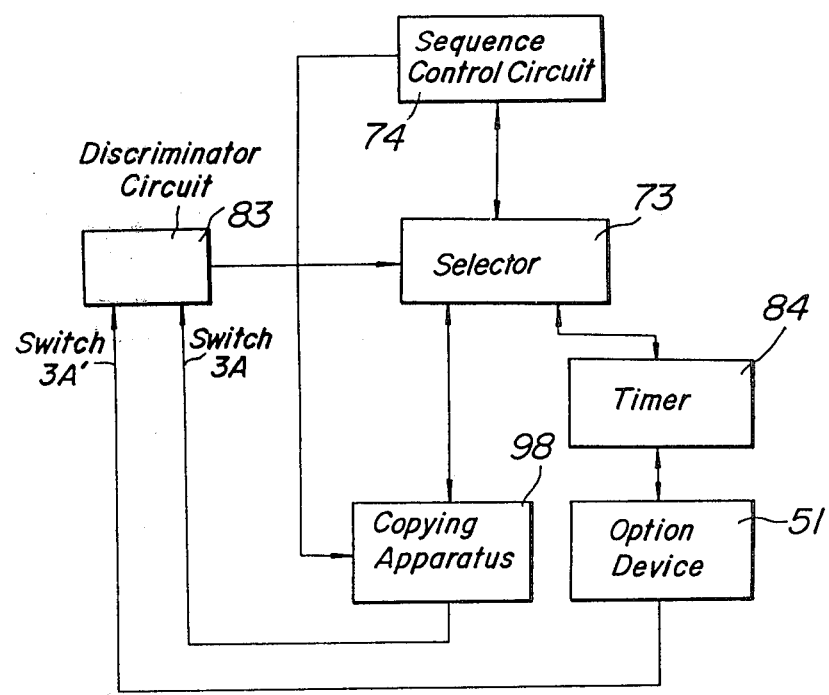
FIG_9

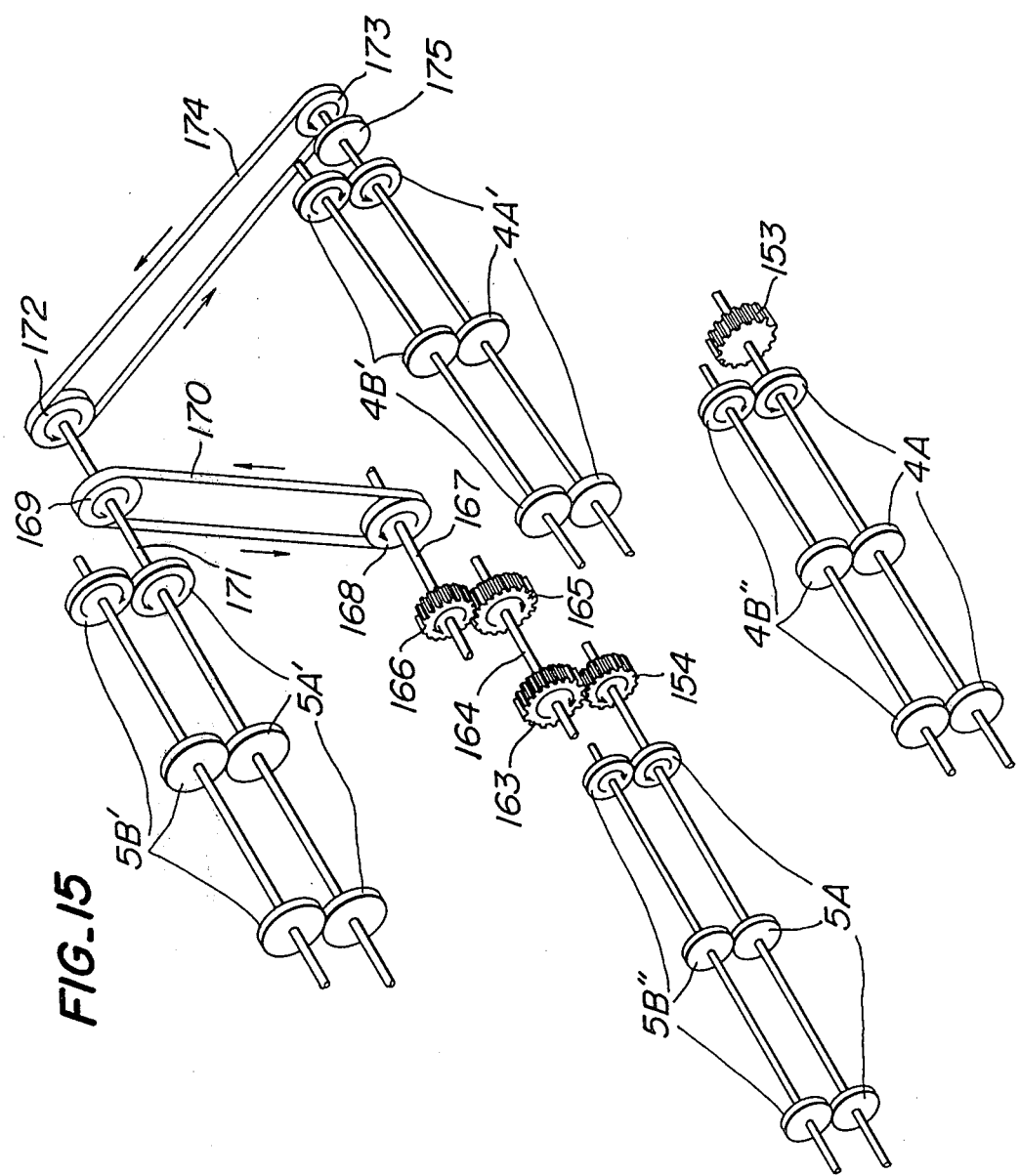

DUPLICATING SYSTEM COMPRISING ELECTROPHOTOGRAPHIC COPIER AND OPTION DEVICE

BACKGROUND OF THE INVENTION

The present invention relates to an electrophotographic system comprising an electrophotographic copier and an option device for forming an enlarged or reduced image of a document set in the option device or accessory.

The copying apparatus represented by an electrophotographic copier has been used in many ways for the purpose of copying documents, and almost all of the copiers are constructed to obtain a life-size copy of the same document being copied. On the other hand, there are known copiers that print a reduced image of a large size document or an enlarged image of a microfilm in an electrophotographic manner, but such apparatus is assembled in a copier as an inseparable form, or in case of using it as an option device, use is made of the same optical path as that of the copier itself or use is made of a part of an optical path in common with copier. It is a common technique to assemble a reduction optical system in the copier itself inseparably, but the thus assembled apparatus becomes large and complicated. It is further known to detachably add an optical image projector to the copier itself as an option or accessory device, but such apparatus also has various defects. For example, in Japanese Patent Application Publication No. 4,944/67, Japanese Patent Application Publication No. 8,437/69, Japanese Patent Laid-open No. 62,724/76, Japanese Utility Model Laid-open No. 127,827/77, Japanese Patent Laid-open No. 55,647/77 and the like, there is disclosed that the whole frame of a microfilm image is projected on a document table or a photosensitive member as a still picture by an option device and the projected image is scanned and exposed in the former apparatus by a scanning optical system, while in the latter apparatus the projected image is directly converted into an electrostatic latent image. However, the copier for copying the whole frame of a microfilm image projected as a still picture is as large as the apparatus itself and lacks universality and convenience as compared with the copier of the document moving, scanning and exposing type which has recently been widely used. In the former system for projecting the microfilm image on the document table, when an enlarged image is projected by an option device, it is necessary to provide a long optical path in the device, so that the option device becomes disadvantageously large.

Further, in copending U.S. Patent Application Ser. No. 261,740, there is disclosed a duplicating system comprising an electrophotographic copier of the slit exposure and scanning type in which the document to be copied is moved at a given constant speed with respect to a scanning optical system and an option device also of the slit exposure and scanning type.

This duplicating system comprises an electrophotographic copying apparatus which includes first optical scanning means for making a slit exposure, first means for feeding a first document to be copied at a first speed with respect to said first optical scanning means, photosensitive means for forming an electrostatic latent image corresponding to the image of the document, and means for forming a duplicated copy with the aid of said latent image, and an option device which includes means for detachably mounting the option device into the copying apparatus, second optical scanning means for making a slit exposure, second means for feeding a second document to be copied at a second speed with respect to said second optical scanning means, and optional optical means for projecting the image of the second document onto said photosensitive means of the copying apparatus; wherein said second optical scanning means in the option device is so constructed that the image of the second document is projected onto the photosensitive means through an optical path which passes through entrance and exit points of said first optical scanning means, but does not include the first optical scanning means.

In this duplicating system, since the image of the second document fed in the option device is projected onto the photosensitive means at the same position at which the image of the first document fed in the copying apparatus is projected, it is not necesary at all to modify a sequence control device provided in the copying apparatus. Therefore, the duplicating operation by means of the copying apparatus and the option device is simple, and further the copying apparatus and option device can be manufactured easily.

In the duplicating system of the kind mentioned above, it is preferable to provide document detecting devices such as microswitches and photoelectric switch at the document insertion ports of both the copying apparatus and the option device, thereby automatically starting the duplication for a detected document. However, after a first document has been detected by one of the detecting devices and a duplicating operation for the first document has been started, when a second document is detected by the other detecting device, the second document will also be fed and scanned. Therefore, a correct duplication could not be effected. In order to avoid this the second document must be inserted into the duplicating system after the duplication for the first document has been completed, but this imposes inconvenience and difficulty upon a user. The above mentioned drawback may be removed by modifying the control sequence, but such a solution results in a complicated sequence control and conflicts with the above described advantage obtained by providing the optical scanning means in both the copying apparatus and the option device so as to control them under the common sequence control.

SUMMARY OF THE INVENTION

The present invention has for an object to provide a novel and useful duplicating system comprising an electrophotographic copier or copying apparatus of the slit exposure and scanning type and an accessory or option device of the slit exposure and scanning type detachably mounted on the copying apparatus for projecting an image of the document inserted into the option device, which system can eliminate the above described disadvantages of the known duplicating system.

It is another object of the invention to provide a duplicating system in which a document can be inserted in the copier or the option device even if the other of the copier or the option device is scanning a document.

It is still another object of the invention to provide a duplicating system in which a document which has been inserted into the copier or the option device during the duplication of a previous document can be automatically exposed and scanned after the duplication of the previous document has been finished.

It is still another object of the invention to provide a duplicating system in which the document feeder of the option device can be controlled by means of the same sequence control as that for controlling the copying apparatus.

According to the invention, a duplicating system comprises an electrophotographic copying apparatus which includes first document detecting means for detecting a first document to be copied to produce a first document detection signal, first optical scanning means for making a slit exposure, first document feeding means for feeding the first document at a first speed with respect to said first optical scanning means in response to said first document detection signal, photosensitive means for forming an electrostatic latent image corresonding to the image of the document, and means for forming a duplicated copy wih the aid of said latent image;

an option device which includes means for detachably mounting the option device onto the copying apparatus, second document detecting means for detecting a second document to be copied to produce a second document detection signal, second optical scanning means for making a slit exposure, second document feeding means for feeding said second document at a second speed with respect to said second optical scanning means in response to said second document detection signal, and optional optical means for projecting the image of the second document onto said photosensitive means of the copying machine; and control means connected to said first and second document detecting means for inhibiting a document feeding operation of one of the first and second document feeding means in response to one of said first and second document detection signals for a given time period after the other of said first and second document detection signals is produced.

BRIEF EXPLANATION OF THE DRAWINGS

FIG. 1 is a cross section showing schematically an embodiment of a known electrophotographic copying apparatus of the slit scanning type to which the present invention can be advantageously applied;

FIG. 6 is a block diagram showing an embodiment of a control circuit;

FIG. 8a is a schematic view showing another embodiment of the option device according to the invention and FIG. 8b is a block diagram illustrating a control circuit thereof;

FIG. 9 is a block diagram depicting another embodiment of the control circuit;

FIG. 15 is a perspective view illustrating the document feeder of the option device.

DESCRIPTION OF THE PREFERRED EMBODIMENTS

Figure 2A:
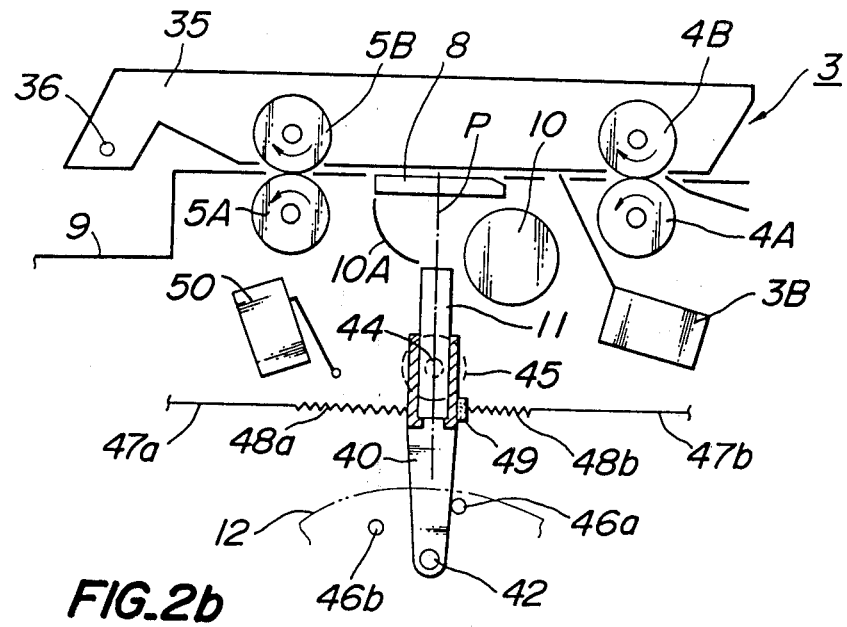
FIGS. 2a and 2b are schematic views illustrating a mechanism for withdrawing an optical system of the copying apparatus when using an option device in the duplicating system according to the present invention.

Referring now to the drawings, wherein the same reference numerals designate the same or corresponding parts throughout the several views, FIG. 1 shows one embodiment of a conventional electrophotographic copying apparatus or copier, to which the present invention is preferably applied. The copying apparatus in this embodiment is of the type that carrys out scanning and exposure by moving a document through a fixedly arranged scanning optical system. In this copying apparatus, a sheet-like document 1 is placed on an inclined document table 2, inserted into a document feeder 3 from the direction of an arrow A, moved by document feed rollers 4A, 4B and 5A, 5B provided in the document feeder 3, and finally discharged on a document tray 9.

The document feed rollers 4A and 5A are selectively driven in response to signals generated by switches 3A and 3B which are arranged in a document feed path to detect the document 1. The upstream feed roller 4A is connected through a clutch (not shown) to a driving motor (not shown). The downstream feed roller 5A is directly connected to the driving motor and thus is rotated as long as the motor rotates during a duplicating period. The clutch is driven in response to a signal which is produced when the switch 3A is actuated by the front edge of the manually inserted document 1. Then the roller 4A is rotated to feed the document 1 at a given speed V. As soon as the frong edge of document 1 is detected by the switch 3B, the clutch is deenergized so as to stop the document feed for a relatively short time. At a suitable time the clutch is actuated again to restart the feeding of the document 1. When the rear edge of document 1 has passed through the switch 3B, the switch is turned off and the clutch is deenergized so as to stop the rotation of the feed roller 4A. The rollers 4B and 5B rotate together with the rollers 4A and 5A, respectively.

During the feeding of document 1 through the feeder 3, the document 1 is illuminated by an illumination lamp 10 such as a fluorescent lamp and reflector 10A, and a document image is projected on a rotating photosensitive drum 12 by an optical system 11 to make a slit exposure consisting of an array of converging optical fibers through a transparent glass plate 8. The photosensitive drum 12 comprises a conductive substrate and a photoconductive layer consisting of, for example, Se selenium on the surface thereof. The drum 12 is rotated in the direction of an arrow B, erased by an erasing lamp 13, thereafter uniformly charged by a corona charger 14. The drum forms an electrostatic latent image on the photoconductive layer by receiving the optical image of the document. This electrostatic image is developed with toners by a dry developing device 15 using a development agent of the two composition type and is carried to a toner image transfer section 16 according to rotation of the photosensitive drum 12. On the other hand, record papers 18 provided in a cassette 17 are taken out one by one by swinging and rotating pickup roller 19 and are sent to the toner image transfer section 16 by registering rollers 20 at a predetermined rate. In the toner image transfer section 16, the record paper is conveyed between a biased transfer roller 21 applied with a bias voltage and the photosensitive drum 12 so as to superimpose it on the toner image thereby to transfer a toner image onto the paper. In this case, the record paper 18 is closely carried to the toner image, i.e., the photosensitive drum 12, so that the paper is peeled off by a peeling claw 22 and an air flow which will be explained later on, conveyed along a guide plate 23, and fed into a fixing device 25 having a heater by means of carrying rollers 24, and then the toner image is fixed thereon. Finally the paper is dicharged on a copy tray 27 by discharging rollers 26.

The toner image formed on the photosensitive drum 12 is not completely transferred to the record player, but a part thereof remains on the drum 12, so that the remaining toner particles are brushed off by a rotating cleaner brush 28. The brushed-off toner particles are removed by the air flow generated by rotation of a fan 29 and collected by filters 30. The cleaner brush 28, filters 30, and the fan 29 are covered with a housing 31 to obtain an effective toner removal force and to prevent the toner from being dispersed in the apparatus. Exhausted air from the fan 29 is guided to a duct 32. An exhaust port 32a of the duct 32 faces the toner image transfer section 16 so as to act together with the claw 22 thereby effectively peeling the record paper from the photosensitive drum 12. The cleaner brush 28 is rotatably pivoted on an arm 34 rotatably mounted around a supporting shaft 33. When an electrostatic latent image once formed on the photosensitive drum 12 is repeatedly used, the toner developing and transferring steps are repeated, and, in case of multiple copying in which the toner images are successively transferred onto a plurality of record papers, the cleaner brush 28 is separated from the photosensitive drum 12. In addition, an upper carrying mechanism 35 of the document feeder 3 is so constructed that it can be opened and closed around a shaft 36 in the direction shown by an arrow C. When copying thick documents such as a book or the like, the carrying mechanism 35 is rotated in the direction of the arrow C and placed on the document tray 9 so as to form a thick document carrying path. The operation of the aforementioned parts which constitute the copying apparatus is controlled by detecting the document position by the switches 3A, 3B arranged in the document carrying path. The copying apparatus illustrated in FIG. 1 is of compact construction and duplicates ordinary sheet-like documents and books with a unit magnification.

The construction of adding a microfilm enlarged image projection device, a document reduced image projection device, or the like, as an option device to the copying apparatus of such document moving type with the scanning and exposing system has such advantages that the versatility of the copier is enlarged, and a person who does want such functions can simply choose not to use them. Thus, the copying apparatus is very high in usable value. However, one problem is to inexpensively make the device having such construction. If the apparatus becomes complicated in construction, its usable value is lost.

As apparent from the prior art, in the system of projecting an optical image formed by an option device through an optical path of the copying apparatus itself, in order to converge a luminous flux of the projected image to a projection lens of the apparatus itself, the optical system should be improved by providing a Fresnel lens or the like. Moreover, the type which uses the same optical path as that of the copying apparatus itself but keeps out a projection lens of the apparatus itself is known as a one shot exposure system. However the one shot exposure system makes the copier large and does not lend itself to the miniature and handy copier which is the subject of the present invention. The present inventors have proposed in copending U.S. Patent Application Ser. No. 261,740 a duplicating system of simple construction comprising a copying apparatus of the document scanning type which can receive an optical image from an option device.

Figure 3:
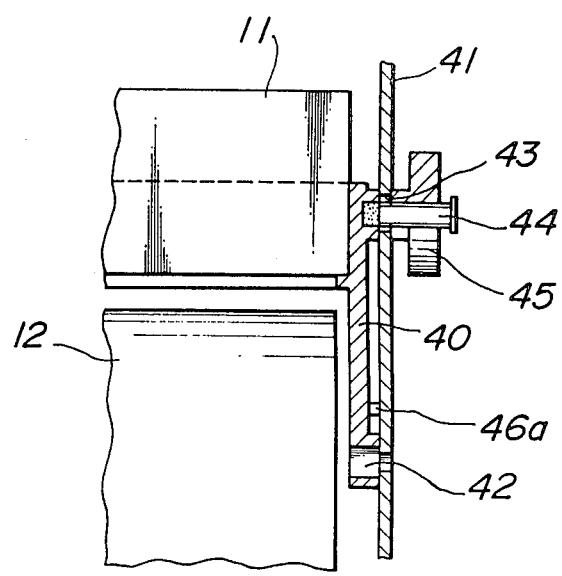
FIG. 3 is a cross section showing the moving mechanism of FIG. 2.

FIG. 2a is a schematic view showing an embodiment of the copying machine of the document scanning and exposing type to be used in the duplicating system according to the invention. In FIG. 2a, an option device is not yet added to the copying apparatus. The copying apparatus shown in FIG. 2a is almost the same as the copying apparatus illustrated in FIG. 1 except that a slit type exposing optical system 11 consisting of the array of converging optical fibers is not fixedly provided, but is swingably mounted. That is to say the optical system 11 is supported by a frame 40 which is journaled to a main body 41 about a shaft 42 as best shown in FIG. 3. In the main body 41 an arcuate guide recess 43 is formed extending in the swinging direction of the frame 40. A screw 44 is secured to the frame 40 through the recess 42. To the screw 44 is fastened an operating handle 45.

By turning the handle 45 after the screw 44 has been moved to a suitable position, the frame 40 and thus the slit exposing optical system 11 may be fixedly positioned with respect to the main body 41. In FIG. 2a, the frame 40 is positioned in such a manner that it makes contact with a stopper pin 46a secured to the main body 41. In this position, an optical image of a document which is fed by the document feeder 3 is projected onto the photosensitive drum 12 by means of the slit exposing optical system 11 situated in an optical path P. It should be noted that the photosensitive drum 12 is shielded against light except for the slit exposing optical system 11 by means of hardware 47a, 47b of the main body and shielding bellows 48a, 48b. One end of the bellows 48a is connected to the hardware 47a and the other end is coupled with a base portion of the frame 40. One end of the bellows 48b is connected to the hardware 47b and the other end to a plate 49 which is in contact with the frame 40 in the condition shown in FIG. 2a. The plate 49 extends in an axial direction of the drum 12 and is secured to the main body.

Figure 2B:
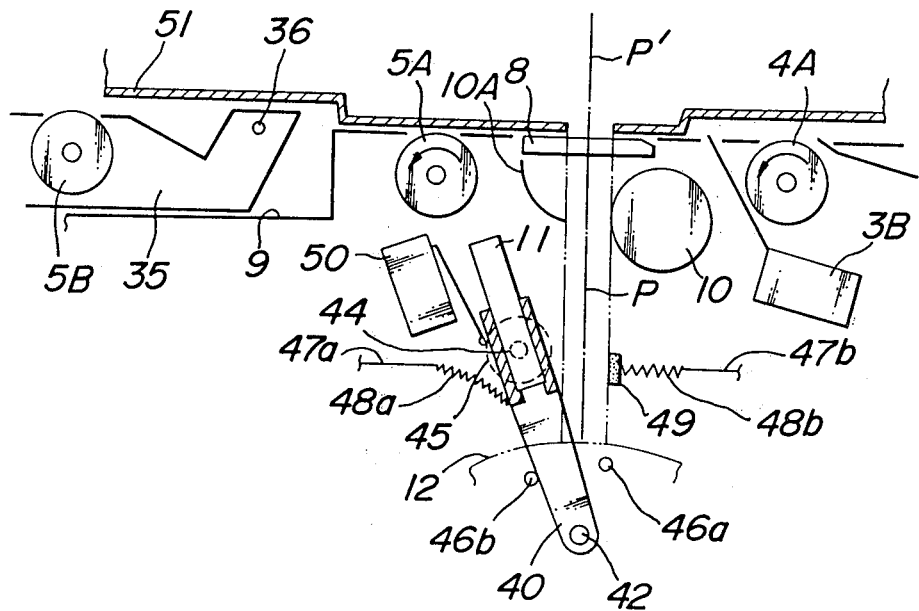

By loosening the handle 45, the optical system 11 can be manually turned in the counter clockwise direction in FIG. 2a into a position shown in FIG. 2b. In the present embodiment, this rotational movement of the optical system 11 in the counter clockwise direction can be limited by a stopper pin 46b secured to the main body 41. In this position, the optical system 11 is withdrawn out of the optical path P. This position of the system 11 is detected by a microswitch 50. After the handle 45, and, thus the slit exposing optical system 11, has been turned into the position shown in FIG. 2b, the frame 40 is secured to the main body 41 by tightening the handle 45.

In order to mount an option device 51 on the copying apparatus, the upper portion 35 of document feeder 3 is withdrawn to the left by rotating it about the shaft 36. Then the option device 51 is mounted on the copying apparatus in such a manner that an optical path P′ of the option device 51 is made completely coincident with the optical path P of the copying apparatus. In this manner, an image projection start position on the photosensitive drum 12 can be made identical both for the copying operations with and without the option device 51. Therefore, a sequence control can be commonly used for both operations.

It should be noted that it is advantageous to provide click mechanisms for positioning the slit exposing optical system 11 at the two operational positions shown in FIGS. 2a and 2b, respectively.

In the present embodiment, the option device 51 can be detachably mounted on the copying apparatus. In this case, when the option device is used, a user can conveniently insert the document to be copied into the option device in the same direction as that into which the document is inserted into the copying apparatus. Otherwise the user has to check the front and rear and right and left of the document and of a copy to be duplicated. Further, the document guide marks on the option device should be reversed with respect to those on the table of the copying apparatus.

When the duplication is effected, while the document is moved with respect to the fixed slit exposing optical system 11, the rotational direction of the photosensitive drum 12 should be made identical with the document feed direction; otherwise the image might be shifted on the drum surface. In order to make the document feed direction in the option device identical with that in the copying apparatus, there should be provided in the option device an optional optical system for forming an erect real image of the document to be duplicated by means of the option device. This optional optical system may be provided in various forms.

Figure 4:
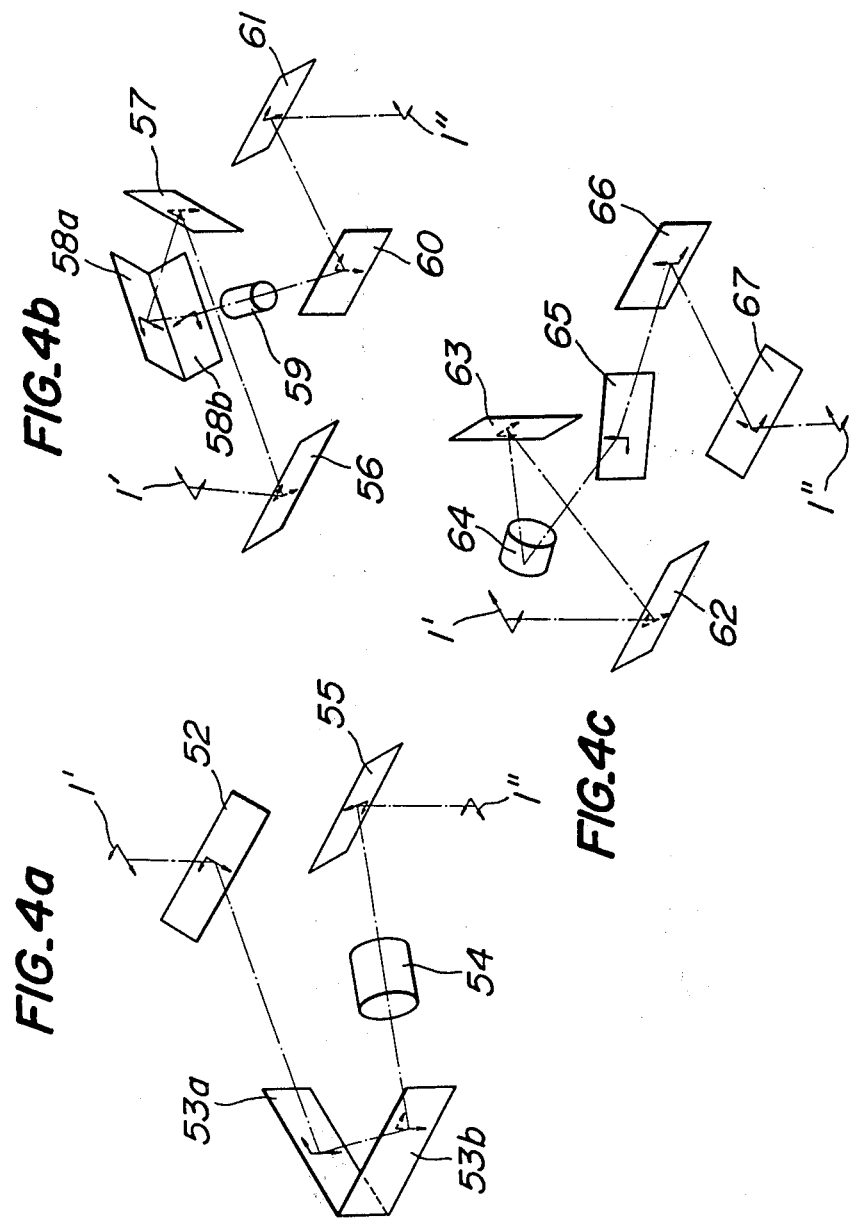
FIGS. 4a, 4b and 4c are perspective views showing three embodiments of an optional optical system installed in an option device of the duplicating system according to the invention.

FIGS. 4a, 4b and 4c are perspective views showing three embodiments of the optional optical system for forming an erect real image of the document. In the embodiment illustrated in FIG. 4a, a document image 1′ is reflected by a mirror 52 and then reflected by Dach mirrors 53a and 53b so as to reverse the image right and left. The image is further inverted up and down as well as right and left by means of a lens 54. Finally the image is reflected by a mirror 55 to form a reduced document image 1″.

In the embodiment illustrated in FIG. 4b the document image 1′ is first reflected by mirrors 56 and 57 and is further reflected by Dach mirrors 58a and 58b toward a lens 59. An image formed by the lens 59 is reflected by a mirror 61 to form a reduced document image 1″.

In the embodient shown in FIG. 4c, the document image 1′ is introduced through mirrors 62 and 63 to an inmirror lens 64 and an image formed by the lens 64 is projected by means of mirrors 65, 66 and 67 as a reduced, erect real image 1″.

By constructing the optional optical system in the option device as shown in FIGS. 4a to 4c, the reduced document image 1″ is shifted with respect to the original document image 1′ in a direction perpendicular to the feeding direction of document. Therefore, the document of the option device may be shifted with respect to the document table of the copying apparatus so that a substantial area of the document table is free from the option device and the operator can easily handle the document on the table of the copying apparatus.

Figure 5:
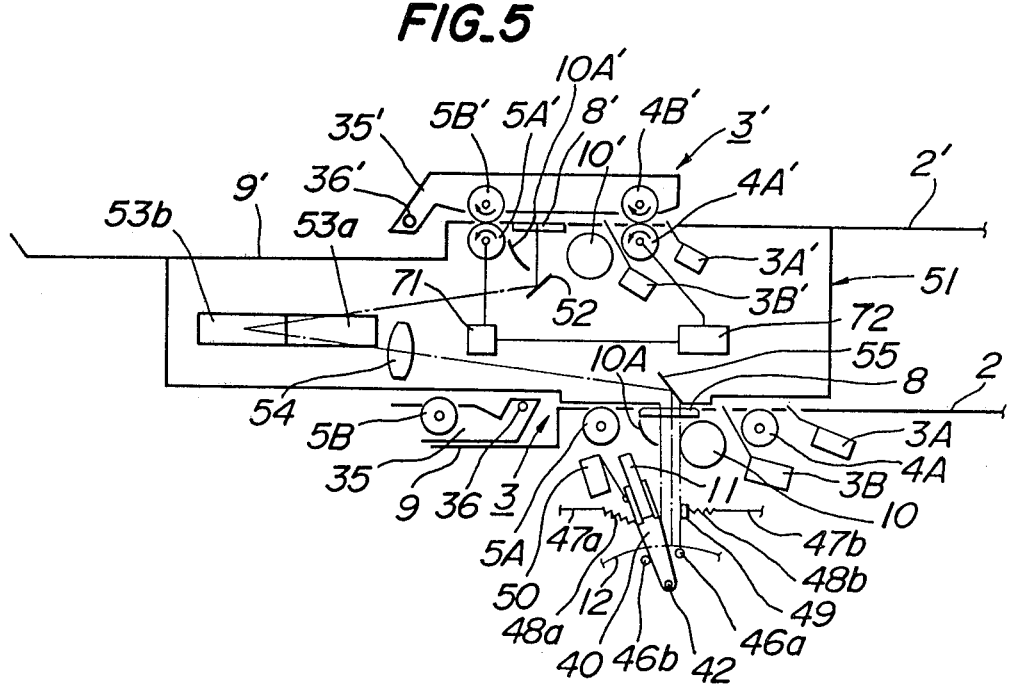
FIG. 5 is a schematic view illustrating an embodiment of the option device in the duplicating system according to the invention.

FIG. 5 shows an embodiment of the option device 51 which is mounted on the copying apparatus shown in FIG. 2. The option device of the present embodiment comprises the optional optical system illustrated in FIG. 4a. The document feed mechanism of the option device 51 is substantially the same as that of the copying apparatus except for several points which will be explained later, and thus members similar to those of the copying apparatus are denoted by the same reference numerals with prime.

The document feed mechanism of the option device 51 comprises a driving motor 71 which is connected to an upstream feed roller 4A′ by means of a clutch 72 and at the same time is directly connected to a downstream feed roller 5A′. In FIG. 5 these connections are shown only schematically. The motor 71 and clutch 72 are controlled by signals derived from document detecting switches 3A′ and 3B′ in the same manner as that of the document feed device 3 of the copying apparatus. As explained above, the option device 51 is so placed on the copying apparatus that their optical paths P and P′ are made coincident with each other, and thus the reduced image of the document formed by the optional optical system in the option device 51 can be projected onto the photosensitive drum 12 from an imaginary sequence control start position thereof. Therefore, the sequence control of the copying apparatus can be used for printing a copy of the document inserted into the option device.

In the duplicating system with the option device explained above, both the copying apparatus and option device comprise the document detecting switches 3A, 3B and 3A′, 3B′ to produce the document detection signals, and the duplicating operation including the exposure and scanning is automatically initiated in response to the document detection signal. Therefore, the sequence for controlling the duplication can be commonly used both for the copying apparatus and the option device. However, it is impossible to insert a document into one of the copying apparatus or the option device while the other device is in an operative condition. This is quite inconvenient for a user. The present invention is to provide a duplicating system in which a document can be inserted into one of the copying apparatus or the option device even if the duplicating operation is effected in the other device.

FIG. 6 is a block diagram showing an embodiment of a control circuit for controlling the operation of the copying apparatus and option device illustrated in FIG. 5. The document detection switches 3A, 3B provided in the copying apparatus and the document detection switches 3A′, 3B′ provided in the option device are connected to input terminals of a selector 73. Further the microswitch 50 which is turned ON and OFF in accordance with the swingable movement of the slit exposing optical system 11 is connected to a select terminal of the selector 73. The selector 73 produces an output signal at either one of output terminals 73A and 73B when either one of the switches 3A and 3A′ detects a front edge of a document. This output signal is supplied to a sequence control circuit 74 provided in the copying apparatus to actuate it. The sequence control circuit 74 produces an illumination lamp energizing signal at its output 74A, a document feeding motor energizing signal at an output terminal 74B, and a clutch energizing signal at an output terminal 74C. These output terminals 74A, 74B and 74C are connected through AND gates 75A to 75C to the illuminating lamp 10, the driving motor and the clutch, respectively, of the copying apparatus, and at the same time through AND gates 75D, 75E and 75F to the illumination lamp 10', the motor 71 and the clutch 72 of the option device. The microswitch 50 is connected through an inverter 90 to the AND gates 75A to 75C and is directly connected to the AND gates 75D to 75F.

When the microswitch 50 is turned ON as illustrated in FIG. 6, i.e., the slit exposing optical system 11 is not removed from the optical path P as shown in FIG. 2a, the AND gates 75A to 75C are enabled and only the copying apparatus is made operative. Under such a condition, when the switches 3A and 3B detect a document and the sequence control circuit 74 is actuated, the illumination lamp energizing signal, the motor driving signal and the clutch driving signal are supplied through the AND gates 75A, 75B and 75C to the illumination lamp 10, the motor and the clutch, respectively, of the copying machine. In this manner the document inserted into the copying apparatus is duplicated. During this operation even if a document is detected by the switches 3A' and 3B' in the option device, the illumination lamp 10', the motor 71 and the clutch 72 in the option device are not operated, because the AND gates 75D to 75F have been all disabled.

Now when the optical system 11 is removed out of the optical path P to turn on the switch 50 as shown in FIG. 2b, only the option device is made operable. When the switches 3A' and 3B' detect a document, the sequence control circuit 74 is actuated via the selector 73 to produce the illumination lamp energizing signal, the motor energizing signal and the clutch energizing signal at the output terminals 74A, 74B and 74C. These energizing signals are supplied through the AND gates 75D, 75E and 75F to the illumination lamp 10', the motor 71 and the clutch 72 in the option device. In this manner, the document exposing and scanning mechanism of the option device is selectively driven and the document inserted into the option device can be duplicated. In this case, the document introduced into the option device 51 can be scanned in the same manner as in the copying apparatus. That is to say, the motor 71 and clutch 72 are energized in response to the detection of a front edge of the document inserted into the option device 51 by the switch 3A' and the document is fed along the document feed path. During this feeding, the document is scanned by the optional optical system in the option device 51 and the reduced image of the document is projected onto the photosensitive drum 12 through the optical path P which has been formed by withdrawing the slit exposing optical system 11. In this case, since the optical path P' of the option device 51 is made completely coincident with the optical path P of the copying apparatus, the imaginary sequence control start position on the drum 12, from which the formation of the latent image corresponding to the reduced document image is effected, is made coincident with that in the case of forming a latent image corresponding to an image of a document inserted in the copying apparatus. Therefore it is not necessary to alter the sequence control of the duplicating operation in the copying apparatus.

In the embodiment explained above, the slit exposing optical system 11 is withdrawn from the optical path P by turning the system. It should be noted that the slit exposing optical system 11 may be pulled out of the optical path P in a direction perpendicular to a plane of the drawing of FIG. 2a and the microswitch 50 may be actuated in response to this pulling operation.

Figure 7A:
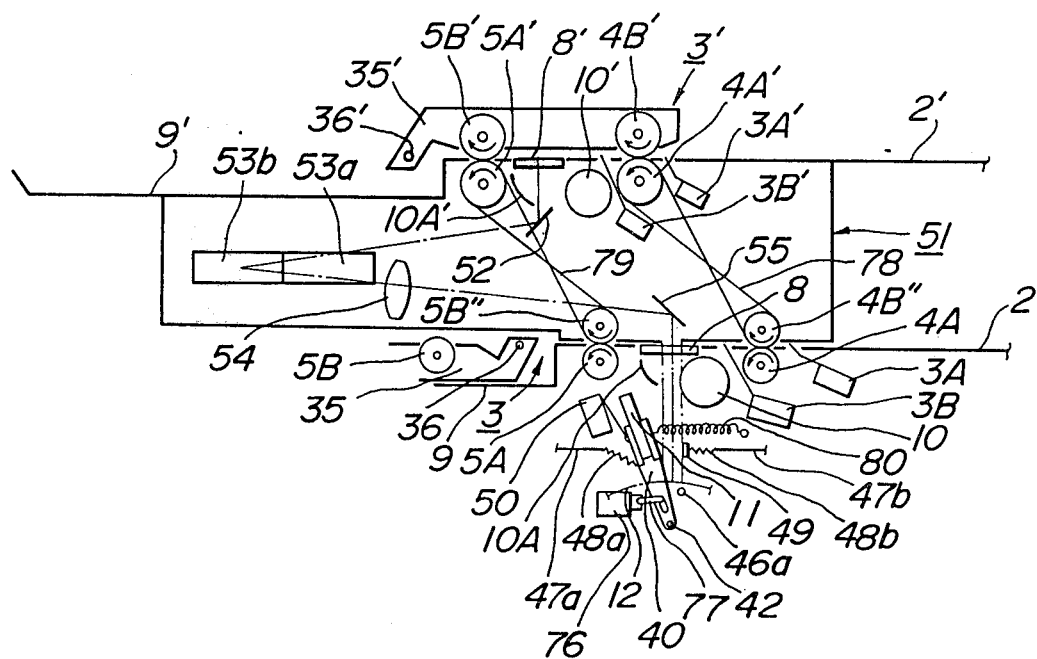
FIG. 7a is a schematic view illustrating another embodiment of the option device according to the invention and FIG. 7b is a block diagram showing a control circuit thereof.
Figure 7B:
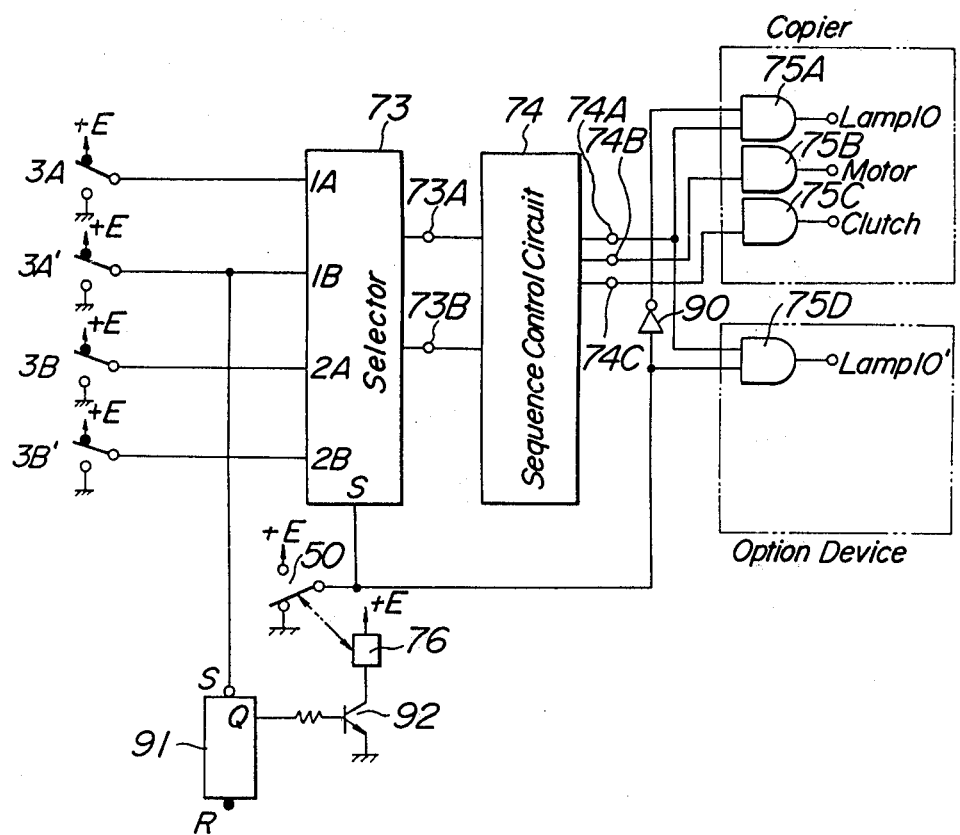

FIGS. 7a and 7b show another embodiment of the duplicating system according to the invention. In this embodiment, the frame 40 for holding the slit exposing optical system 11 is connected to a plunger 77 of a solenoid 76. The solenoid is energized by a document detection signal from the switch 3A' of the option device 51 so as to withdraw the optical system 11 from the optical path P of the copying apparatus. Further in this embodiment, the document feeder 3' of the option device 51 is driven by means of the driving mechanism of the copying apparatus. To this end, the option device 51 comprises a pair of rollers 4B'' and 5B'' which contact the rollers 4A and 5A, respectively of the copying apparatus, and these rollers 4B'' and 5B'' are coupled with the rollers 4A' and 5A' by means of timing belts 78 and 79, respectively. These belts are so arranged that the feeding direction in the option device 51 is made identical with that in the copying apparatus. In the present embodiment, the slit exposing optical system 11 can be automatically moved relative to the optical path P of the copying apparatus, and the document feeder 3' of option device 51 can be driven by the motor and clutch provided in the copying apparatus. Therefore, it is not necessary to provide the motor 71 and clutch 72 shown in FIG. 5 in the option device. It should be noted that in the present embodiment the frame 40 holding the slit exposing optical system 11 is biased by a coiled spring 80 in a clockwise direction in FIG. 7a.

FIG. 7b shows an embodiment of the control circuit to be used in the duplicating system illustrated in FIG. 7a. In this embodiment portions similar to those shown in FIG. 6 are denoted by the same reference numerals. As described above, the duplicating system of the present embodiment is not provided with the driving motor and the clutch in the option device, and thus, only an output terminal 74A of a sequence control circuit 74 is connected to the illumination lamp 10' in the option device through an AND gate 75D. The control circuit further comprises a flip-flop 91 having a set terminal connected to the microswitch 3A' in the option device, and a transistor 82 having a base connected to the Q output terminal of the flip-flop 91, an emitter-collector path of the transistor 92 being connected to the solenoid 76 for driving the optical system 11. Further the microswitch 50 is connected through an inverter 90 only to an AND gate 75A. Therefore, AND gates 75B and 75C may be dispensed with.

When a document is inserted into the option device to actuate the microswitch 3A' to turn on, the flip-flop 91 is set and then the transistor 92 is made conductive to energize the solenoid 76. Then the slit exposing optical system 11 is swung to remove it from the optical path P and the microswitch 50 is turnned on. Then the select terminal S of the selector 73 becomes a high level and the input terminals 1A and 1B are selected. Therefore, the signals from the switches 3A' and 3B' are supplied to the sequence control circuit 74 via the selector 73. The high level signal from the microswitch 50 enables the AND gate 75D, and thus only the illumination lamp 10' in the option device is turned on. At the same time the rollers 4A', 4B', 5A', 5B' in the option device are driven in synchronism with the rollers 4A, 4B, 5A, 5B in the copying machine by means of the timing belts 78 and 79. In this manner the document inserted into the option device 51 is scanned and a reduced image of the document is formed by the optional optical system in the option device 51 onto the photosensitive drum 12 from the imaginary projection-start position, from which position the image of the document inserted into the copying apparatus is also projected.

When a documented is inserted into the copying apparatus, while the option device 51 is mounted thereon, even if the switch 3A is actuated by the front edge of document, the solenoid 76 is not energized and thus the microswitch 50 remains "off". Then the document inserted into the copying apparatus can be duplicated in the normal manner even if the option device 51 is placed on the copying apparatus.

When the option device 51 projects the image of a document reduced by a magnitude of n, the feeding speed $V_R$ of the feeder 3' of the option device 51 should be made equal to a feed speed V of the feeder 3 of the copying apparatus divided by n. That is to say the following equation should be satisfied: $V_R=(1/n)V$. This condition can be easily satisfied by suitably selecting the diameter of the rollers 4A' and 5A' and/or 4B" and 5B". In the embodiment shown in FIG. 7a, the diameter of these rollers 4A', 4B', 5A', 5B' is made larger than that of the rollers 4B" and 5B". Further as explained above in connection with FIG. 1, after the document is selected by the switch 3A', it is fed to the switch 3B' and is stopped thereat for a moment and then the document is further fed. This timing of restart of the document at the position of switch 3B' is made identical with that at the switch 3B in the copying apparatus, because the sequence control circuit 74 is used for both the copying apparatus and the option device. Distances A and $A_R$ from the switches 3A and 3A' to the optical paths P and P', respectively, should satisfy a condition of $A_R=(1/n)A$ and distances B and $B_R$ from rotational axes of the rollers 4A and 4A' to the optical paths P and P', respectively, should satisfy a condition of $B_R=(1/n)B$. By constructing the device in this manner, the reduction or enlargement duplicating operation with the option device 51 can be controlled by the sequence control circuit 74 of the copying apparatus without altering any one of the various timing sequences. Further, the sequence can be initiated by either of the document detection signals from the option device 51 and the copying apparatus.

Figure 8A:
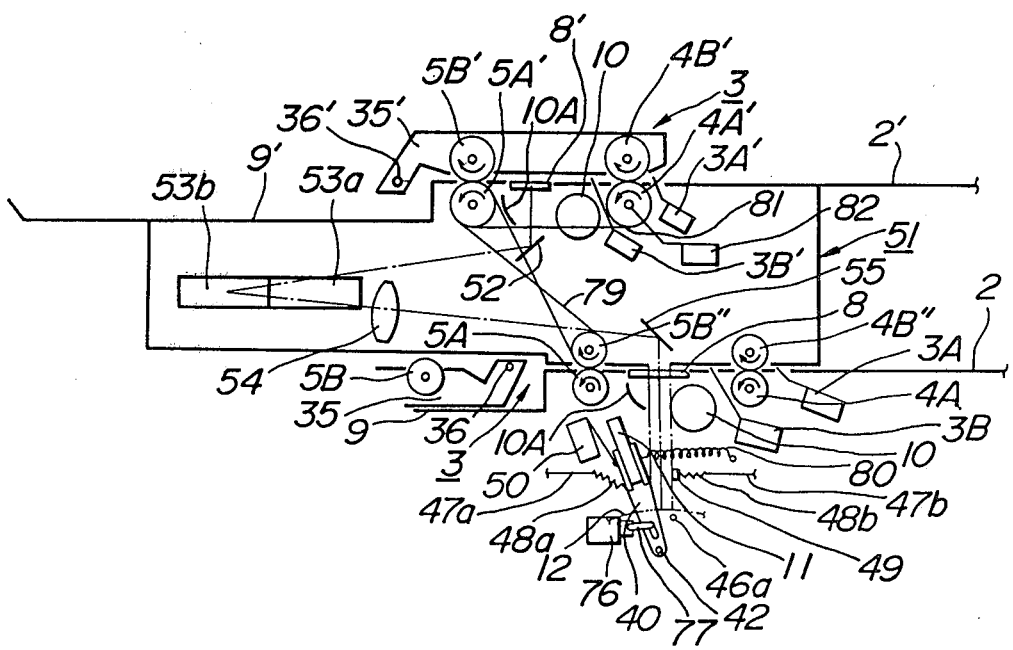

FIGS. 8a and 8b show another embodiment of the option device and its control circuit according to the invention. In this embodiment the downstream roller 5B" is coupled with the downstream roller 5A' by means of the timing belt 79, and the roller 5A' is connected to the upstream roller 4A' by means of a timing belt 81 and a clutch which is controlled by a clutch solenoid 82. Since the downstream roller 5A is always rotated during the duplicating operation, the document feeder 3' of the option device 51 can be driven by the roller 5A. Also in the present embodiment, the duplicating operation with the option device 51 can be controlled by the sequence control circuit 74 of the copying apparatus without changing the timings of the various sequence control signals.

FIG. 8b shows an embodiment of the control circuit of the duplicating system illustrated in FIG. 8a. In the present control circuit use is made of a copy signal produced by the copying apparatus for selectively controlling the copying apparatus and the option device. The copy signal is received at an input terminal 93 and is supplied to one of the terminals of an AND gate 94 of a NAND gate 95. The other input of the AND gate 94 is connected to the switch 3A' in the option device and the other input of the NAND gate 95 is connected to the switch 3A in the copying machine via an inverter 96. An output of the AND gate 94 is connected to a pulse circuit 97 for producing a pulse at a trailing edge of the output signal from the AND gate 74. The pulse from the pulse circuit 97 is supplied to a clock input of a flip-flop 91. Further, an output of the NAND gate 95 is connected to a clear input of the flip-flop 91.

When a document is inserted into the option device 51 while the copy signal (negative going pulse) is not applied to the input 93, the switch 3A' detects the document. Then the output of the AND gate 94 becomes L level (low level) and the pulse circuit 97 produces a pulse which then sets the flip-flop 91. Therefore, the Q output of the flip-flop 91 becomes H level (high level) to make the transistor 92 conductive. Then the solenoide 76 is energized and the switch 50 is turned on. Therefore, the selector 73 conducts the signals from the switches 3A' and 3B' to the sequence control circuit 74. In this manner, the sequence control circuit 74 is actuated to produce the given output signals at the output terminals 74A to 74C. That is the illumination lamp energizing signal at the output terminal 75A is supplied through an AND gate 75D to the lamp 10' in the option device, the motor energizing signal at the output terminal 75B is directly supplied to the motor in the copying machine, and the clutch energing signal at the output terminal 75C is supplied through an AND gate 75F to the clutch 82 in the option device. Then the document inserted into the option device 51 is exposed and scanned.

As long as the flip-flop 91 is set, only the option device is made operative and thus, even if a document is inserted into the copying machine, it is not scanned. During the time a copy signal is not produced, i.e., at the H level, the flip-flop 91 can be reset via the NAND gate 95 when a document inserted into the copying apparatus is detected by the switch 3A. Then the solenoid 76 is deenergized and the switch 50 is turned off. In this manner, only the signals of the switches 3A, 3B in the copying apparatus are selected. The signals generated by the sequence control circuit 74 are supplied via the AND gates 75A and 75B to the illumination lamp 10 and the driving motor, respectively, as well as to the clutch directly. In this manner, the document inserted into the copying apparatus is exposed and scanned. The present embodiment has advantages in that either one of the duplicating operations with and without the option device can be carried out when in fact the document is inserted first into the feeder 3 or 3'. For instance, when the documents are simultaneously inserted into the feeders 3 and 3', both operations are inhibited.

FIG. 9 is a block diagram showing still another embodiment of the control circuit according to the invention. In the previous embodiments, the document detection switches 3A, 3A' and the rollers 4A and 4A' of the copying apparatus and option device 51 are so arranged that the distances A, $A_R$ and B, $B_R$ satisfy the relations $A_R=(1/n)A$ and $B_R=(1/n)B$. However, it may be that these elements could not be arranged in such a manner. In this embodiment, the rollers 4A' and 5B' and switches 3A' and 3B' in the document feeder 3' of the option device 51 are arranged in the same geometric configuration as that of the document feeder 3 of the copying apparatus. In order to project the reduced image of a document inserted into the option device 51 onto the drum 12 from the same imaginary sequence control position even in such a configuration, a timer circuit 84 is arranged between the selector 73 and the option device 51 so as to delay the control signals by a predetermined time $\tau$.

Figure 10:
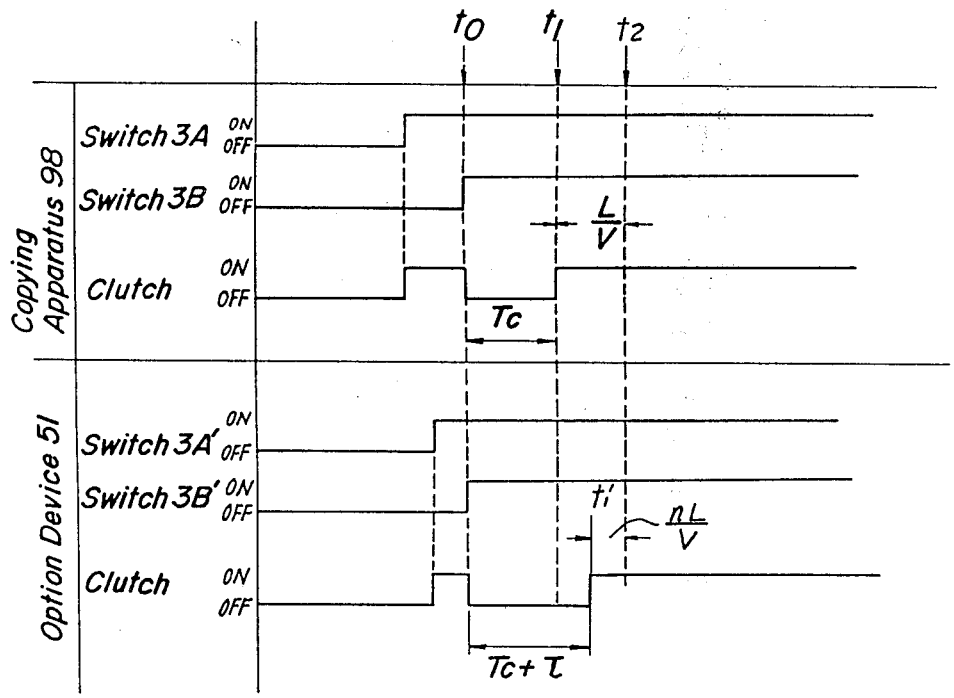
FIG. 10 shows waveforms for explaining the operation of the control circuit of FIG. 9.

As shown in the time chart of FIG. 10, the sequence control is initiated in response to the actuation of the downstream switch 3B or 3B'. That is to say, when the front edge of the document is detected by the switch 3B or 3B', the sequence control circuit 74 is initiated at a start time $t_0$. In the normal duplicating operation shown in an upper portion of FIG. 10, the circuit 74 produces a signal for actuating the clutch at a feed time $t_1$ after a time period $T_C$ from the starting portion $t_0$. Then the document is fed again to the scanning position along a distance L at the speed V and the front edge of the document arrives at the scanning position at a time $t_2$ so as to start the projection. The time period from the time $t_1$ to $t_2$ is equal to L/V. Contrary to this in the case of the duplicating operation with the option device, the document feed start time $t_1$ is delayed to a time $t_1'$. A time period from this delayed timing $t_1'$ to the projection start timing $t_2$ is equal to nL/V. Therefore, the delay time $\tau$ should be equal to $L/V(1-n)$. Then the projection start time $t_2$ can be made identical for both duplicating operations with and without the option device.

Figure 11:
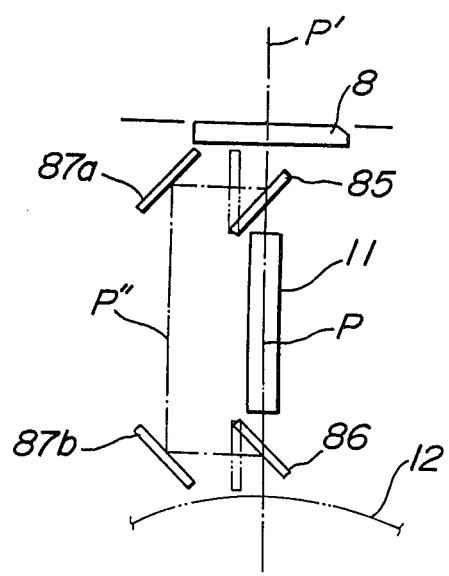
FIG. 11 is a schematic view showing another embodiment of the optical path changing mechanism.

FIG. 11 shows another embodiment of the device for withdrawing the slit exposing optical system 11 of the copying apparatus out of the optical path for projection of an image of the document inserted into the option device. In this embodiment, the slit exposing optical system 11 is not movable, but is fixed. At the entrance and exit sides of the optical system 11 are arranged mirrors 85 and 86 which are swingable in conjunction with each other. The device further includes fixed mirrors 87a and 87b. When duplicating without the option device, the mirrors 85 and 86 are withdrawn out of the optical path P passing through the optical system 11 as shown by dashed lines. When the document image is to be projected by means of the option device onto the photosensitive drum 12, the mirrors 85 and 86 are driven into the optical path as illustrated by solid lines. Then the image is projected onto the drum via the optical path P' in the option device and an optical path P'' formed by the mirrors 85, 86, 87a and 87b in the copier. Also in this embodiment, the image of the document inserted into the option device can be projected on the drum at the same exposure position as that in the normal duplicating operation without the option device. It should be further noted that an optical system for projecting a reduced image may be inserted between the mirrors 87a and 87b.

Figure 12:
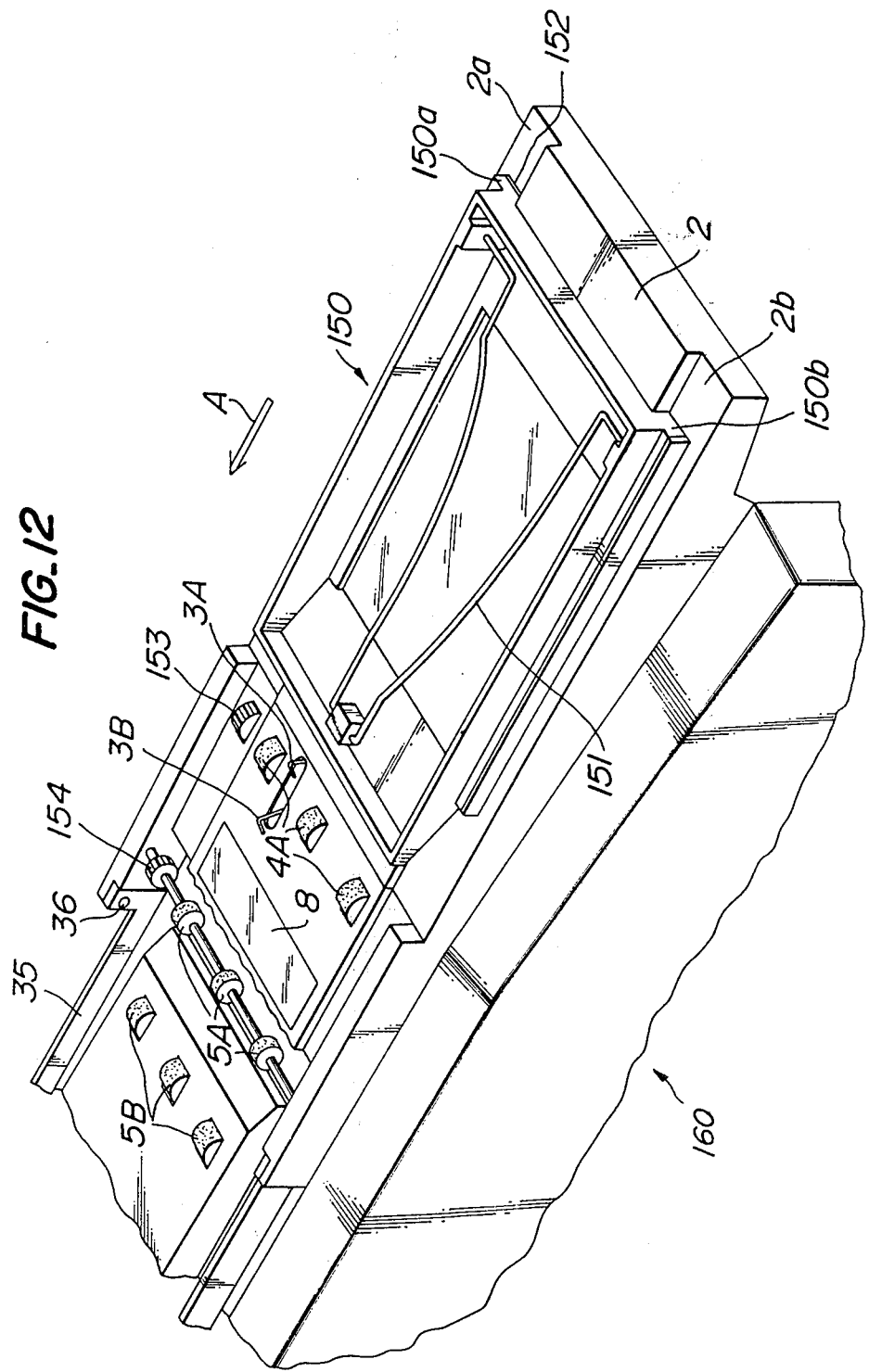
FIG. 12 is a perspective view showing another embodiment of the copying apparatus according to the invention.

FIG. 12 is a perspective view of the copying apparatus shown in FIG. 1 with the upper feed mechanism 35 being turned away from the lower feed mechanism. When a thick document such as a book is to be duplicated, the book is placed on a thick document carriage 150 made of transparent material. The carriage comprises a movable holder 151 for holding the book in position. Along the side edges of the carriage are integrally formed flanges 150a and 150b. A rack 152 is secured to a lower surface of the flange 150a. In the document table 2 recesses 2a and 2b are formed, along its side edges, for accommodating the flanges 150a and 150b, respectively. By sliding the carriage in the direction A, the rack 152 is engaged with gears 153 and 154 successively and thus, the carriage 150 is fed at a given velocity by means of the gears 153 and 154 and the rack 152.

Figure 13:
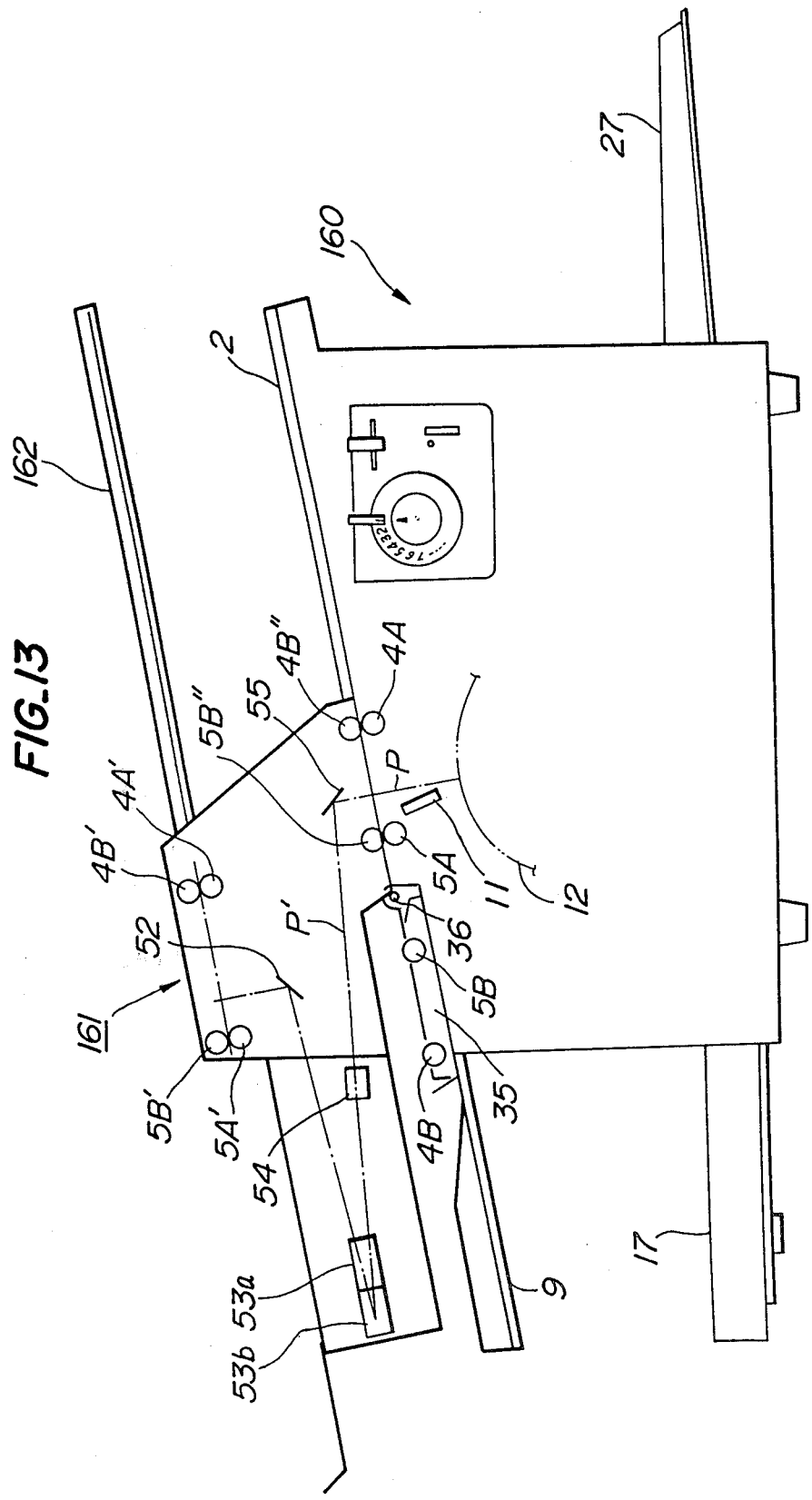
FIG. 13 is a front view illustrating a complete duplicating system according to the invention.

FIG. 13 is a front view illustrating the copying apparatus 160 shown in FIG. 12 and an option device 161 mounted on the copying machine 160. The option device 161 comprises a document table 162 and the optional optical system shown in FIG. 4a, including the mirrors 52, 53a, 53b and 55 and the projection lens system 54. The exit point of the optical path P' in the option device 161 is made coincident with the optical path P in the copying apparatus 160.

Figure 14:
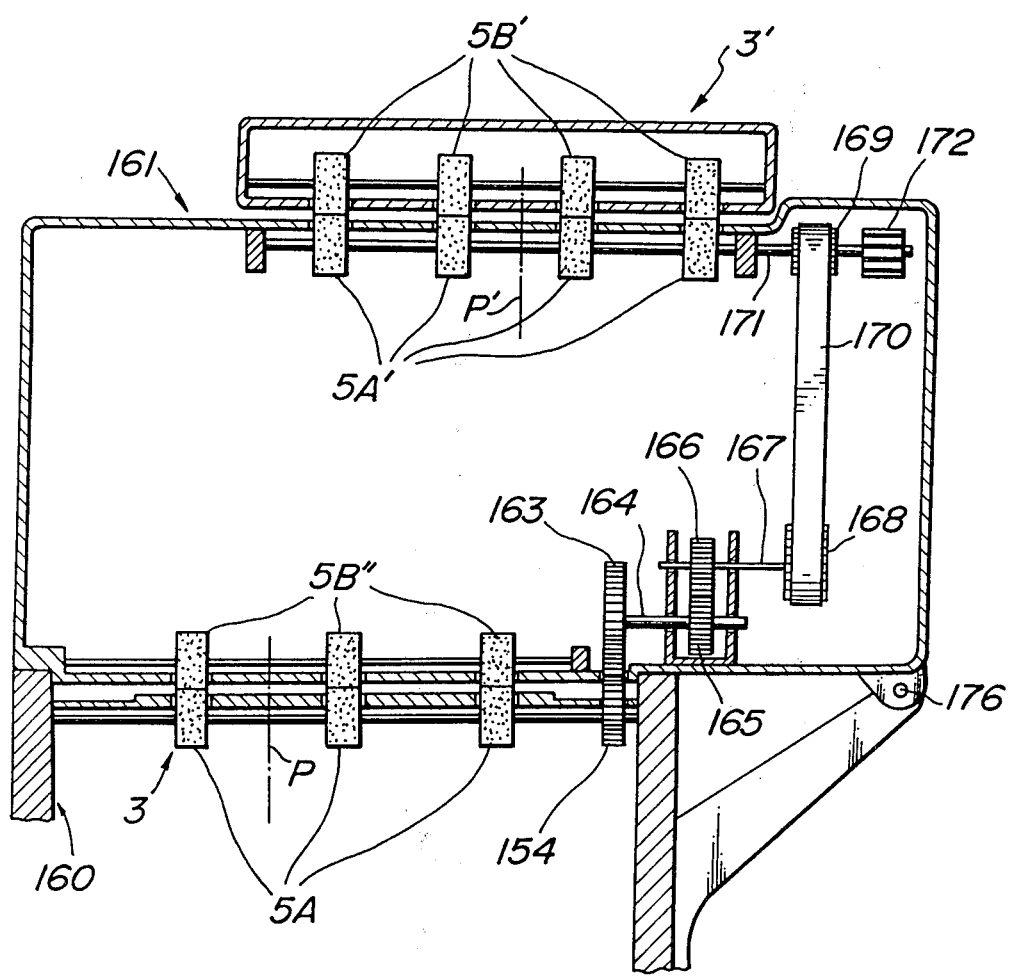
FIG. 14 is a cross section showing the document feeder of the option device.

In the present embodiment, the document feeder 3' of the option device 162 is driven by the document feeder 3 of the copying apparatus 160 by means of the gear 154 as shown in FIGS. 14 and 15. That is to say, the option device 161 comprises a gear 163 which engages with the gear 154 of the document feeder 3 of the copying apparatus 160. The gear 163 is connected to a shaft 164 to which is also secured a gear 165. The gear 165 is then engaged with a gear 166 connected to a shaft 167 to which a roller 168 is also fixed. The roller 168 is coupled with a roller 169 by means of a timing belt 170, and the roller 169 is secured to a shaft 171 to which the document feed rollers 5A' are fixed. To the shaft 171 is also connected a roller 172 which is coupled with a roller 173 by means of a timing belt 174. The roller 173 is connected to the feed rollers 4A' via a clutch 175. In this manner the feed rollers 5A' of the option device 161 are rotated in a given direction as long as the document feed rollers 5A of the copying apparatus 160 are rotated. The feed rollers 4A' of the option device 161 are rotated only when the clutch 175 is energized. By suitably choosing diameters of the gears 165 and 166 and rollers 168, 169, 172 and 173, the document feed speed in the option device 161 may be equal to or different from the document feed speed in the copying apparatus 160. In the present embodiment, since the option device 161 is used to project a reduced image of the document onto the photosensitive drum 12, the feed speed in the option device 161 is made higher than that in the copying apparatus 160. As clearly shown in FIG. 14, the option device 161 can be turned about a shaft 176 extending in the direction of the document feed and the copying apparatus 160 can be simply made free from the option device 161. Then the book carriage 150 can be used at will.

As shown in FIG. 14, when the optional optical system shown in FIG. 4a is used, the entrance point of the optical path P' in the option device 161 is shifted rightward with respect to the optical path P of the copying apparatus 160. Therefore, a substantial area of the document table 2 of the copying apparatus is not covered by the option device 161, so that the operator can easily and correctly place the document on the document table 2 of the copying machine. Further an automatic document feeder may be arranged on the document table 2 without being hindered by the option device 161. Usually the various operating members such as a copy set dial, a stop button and a copy density adjusting lever and various indication lamps are provided on the front panel of the copying apparatus. In this embodiment, since the option device 161 is shifted backward, these operating members and indication lamps are not covered or hindered by the option device. Moreover, the height of the option device can be made small and thus, the document table 162 is situated at a relatively lower level, so that the operator can easily handle the option device. Further, the optional optical system installed in the option device 161 can be made simple.

The present invention is not limited to the embodiments explained above, but may be modified in various ways within the scope of the invention. For instance, in the above embodiment, the copying apparatus comprises an array of converging optical fibers. But it should be noted that any other type of optical system may be used. Further, the selection between the copying apparatus and option device may be automatically effected by a switch which is actuated when the option device is mounted on the copying apparatus.

As explained above in detail, in the duplicating system according to the invention, the functionality of the copying apparatus can be materially increased by simply mounting the small option device. The duplicating operation with the option device can be equally controlled by the sequence control circuit provided in the copying apparatus. Moreover, the existing copying apparatus can be used in the duplicating system according to the invention with minimum structural change. Further, the function of the copying apparatus is not lost or deteriorated at all by the provision of the option device and thus, the copying apparatus can be used as is even if the option device is added thereto. Moreover, when the duplication is initiated automatically by inserting the document in the copying apparatus or the option device, the operation is considerably improved.

What is claimed is:

1. A duplicating system comprising
    an electrophotographic copying apparatus which includes first document detecting means for detecting a first document to be copied to produce a first document detection signal, first optical scanning means for making a slit exposure, first document feeding means for feeding the first document at a first speed with respect to said first optical scanning means in response to said first document detection signal, photosensitive means for forming an electrostatic latent image corresponding to the image of the document, and means for forming a duplicated copy with the aid of said latent image;
    an option device which includes means for detachably mounting the option device onto the copying apparatus, second document detecting means for detecting a second document to be copied to produce a second document detection signal, second optical scanning means for making a slit exposure, second document feeding means for feeding said second document at a second speed with respect to said second optical scanning means in reponse to said second document detection signal, and optical means for projecting the image of the second document onto said photosensitive means of the copying machine; and
    control means connected to said first and second document detecting means for inhibiting a document feeding operation of one of the first and second document feeding means in response to one of said first and second document detection signals for a given time period after the other of said first and second document detection signals is produced.

2. A system according to claim 1, wherein said optional optical means includes means for projecting the image of the second document onto the photosensitive means through the same optical path as that through which the image of the first document is projected onto the photosenstive means.

3. A system according to claim 2, wherein said first scanning optical means in the copying apparatus comprises an array of converging optical fibers and means for withdrawing the array of converging optical fibers out of said optical path in the copying apparatus, when the image of the second document is projected onto the photosensitve means.

4. A system according to claim 33, wherein the control means comprises a selection switch actuated by the withdrawal of said array of converging optical fibers to produce a selection signal, and gating means for selectively supplying various control signals to the copying apparatus or the option device in response to said selection signal.

5. A system according to claim 4, wherein saidd gating means comprises a first group of logic gates having outputs connected to the copying apparatus and a second group of logic gates having outputs connected to the option device, and one input of each of the first group of logic gates is commonly connected to said selection switch via an inverter, while one input of each of the second group of logic gates is commonly connected to said selection switch directly.

6. A system according to claim 4, wherein said means for withdrawing the array is automatically actuated in response to an insertion of the second document into the option device.

7. A system according to claim 6, wherein said means for withdrawing the array of converging optical fibers comprises a solenoid having a plunger coupled with the array, a transistor having an emitter-collector path connected in series with the solenoid and a base and a flip-flop having an input connected to said second document detecting means in the option device and an output connected to the base of the transistor.

8. A system according to claim 7, wherein said array withdrawing means further comprises
    a first logic gate having a first input connected to said second document detecting means, a second input and an output;
    a pulse circuit connected between said output of the first logic gate and said input of the flip-flop;
    a second logic gate having a first input connected to said first document detecting means, a second input and an output connected to a clear input of said flip-flop; and
    an input connected to said second inputs of said first and second logic gates for receiving from the copying apparatus a copy signal which represents that the copying apparatus is in a busy condition.

9. A system according to claim 1, wherein said optional optical means
    includes means for projecting the image of the second document with a projection magnitude of n, and said first and second feeding means are so constructed that the first speed is made n times that of the second speed.

10. A system according to claim 9, wherein a time period necessary for the second document travelling from said second detecting means to said second optical scanning means is made n times that of the time period necessary for the first document travelling from said first detecting means to said first optical scanning means.

11. A system according to claim 1, wherein said second feeding means in the option device comprises a driving motor and a plurality of feed rollers driven by said motor to feed the second document in the same document feed direction as that of said copying apparatus.

12. A system according to claim 1, wherein said second feeding means in the option device comprises a plurality of feed rollers for feeding the second document, and means for transferring a driving force of the first feeding means in the copying apparatus to said feed rollers to feed the second document in the same document feed direction as that of said copying apparatus.

13. A system according to claim 12, wherein said driving force transferring means in the option device comprises at least one coupling roller which contacts at least one feed roller provided in the first feeding means for feeding the first document in the copying apparatus, and coupling means for transferring rotational movement of the coupling roller to said feeding rollers of the second feeding means.

14. A system according to claim 12, wherein said driving force transferring means comprises a first gear which is engaged with a second gear provided in said first feeding means for feeding a thick document carriage in the copying apparatus, and coupling means for transferring rotational movement of the coupling gear to said feed rollers of the second feeding means.

15. A system according to claim 1, wherein said optional optical means provided in the option device comprises at least two reflection mirrors and a projection lens system for forming an erecting real image of the second document, and having entrance and exit optical axes which were shifted in a direction perpendicular to the document feed direction.

16. A system according to claim 9, wherein said copying apparatus further comprises sequence control means for controlling the copying apparatus in such a manner that said image is projected onto the photosensitive means from an imaginary control start position, and said second feeding means and second optical scanning means in the option device have a geometric configuration which is similar to that of the first feeding means and first optical scanning means in the copying apparatus so that the image of the second document is projected on the photosensitive means from the same position as said imaginary control start position, and that the duplicating operation for the second document is commonly controlled by said sequence control means provided in the copying apparatus.

17. A system according to claim 16, further comprising means for selectively either one of the copying apparatus or the option device in response to actuation of either one of the first or second detecting means, respectively, and for controlling the selected one of the copying apparatus or option device by means of the sequence control means.

18. A system according to claim 16, further comprising means for delaying a signal supplied from the sequence control means to one of the copying apparatus and the option device by a delay time depending upon a value of said n.

19. A system according to claim 12, wherein said first document feeding means comprises a lower feeding mechanism having feeding rollers and a driving source for rotating the feeding rollers, and an upper feeding mechanism having rollers which are rotated while being in contact with said feeding rollers of the lower feeding mechanism, the upper feeding mechanism being removably mounted on the lower feeding mechanism, and, when the option device is mounted on the copying apparatus after the upper feeding mechanism has been removed from the lower feeding mechanism, said second feeding means is driven by means of said driving source provided in the lower feeding mechanism.

* * * * *